United States Patent
Kato

(10) Patent No.: US 11,804,863 B2
(45) Date of Patent: Oct. 31, 2023

(54) RADIO-FREQUENCY SIGNAL TRANSMISSION/RECEPTION CIRCUIT AND RADIO-FREQUENCY SIGNAL TRANSMISSION/RECEPTION DEVICE

(71) Applicant: Murata Manufacturing Co., Ltd., Kyoto (JP)

(72) Inventor: Takehiko Kato, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/661,144

(22) Filed: Apr. 28, 2022

(65) Prior Publication Data
US 2022/0352909 A1    Nov. 3, 2022

(30) Foreign Application Priority Data

Apr. 30, 2021    (JP) ................................ 2021-078131

(51) Int. Cl.
  *H04B 1/00*    (2006.01)
  *H04B 1/44*    (2006.01)
(52) U.S. Cl.
  CPC ......... *H04B 1/0067* (2013.01); *H04B 1/0064* (2013.01); *H04B 1/44* (2013.01)
(58) Field of Classification Search
  CPC ...... H04B 1/0064; H04B 1/0067; H04B 1/44; Y02D 30/70
  See application file for complete search history.

(56) References Cited

U.S. PATENT DOCUMENTS

| 2017/0070918 A1* | 3/2017 | Zhou | H04B 1/525 |
| 2019/0068127 A1* | 2/2019 | Ishikawa | H03F 3/195 |
| 2020/0343932 A1* | 10/2020 | Akamine | H04B 1/44 |

FOREIGN PATENT DOCUMENTS

JP    2020-182205 A    11/2020

OTHER PUBLICATIONS

CATT, Remaining Issues on SRS, 3GPP TSG RAN WG1 Meeting #92bis, R1-1803749, Sanya, China, Apr. 16-20, 2018.

* cited by examiner

*Primary Examiner* — Nguyen T Vo
(74) *Attorney, Agent, or Firm* — Pearne & Gordon LLP

(57) ABSTRACT

A transmission/reception circuit includes a low-noise amplifier, switches, a band-pass filter, a power amplifier, and a low-pass filter. The low-noise amplifier is connected, at its output terminal, to a terminal. The switch is connected to the input terminal. The band-pass filter is connected to the switch and to an antenna through a terminal. The power amplifier is connected to a terminal. The switch is connected to the output terminal and to the band-pass filter. The low-pass filter is connected to a terminal, and removes a frequency band higher than the frequency band of a signal that is to be transmitted. The switch is connected to the output terminal and to the low-pass filter. The switch is connected to a terminal and to the low-pass filter.

13 Claims, 11 Drawing Sheets

FIG. 2

| ANTENNA | OPERATION | MODULE M101 ||||||| MODULE M102 |||||
|---|---|---|---|---|---|---|---|---|---|---|---|---|---|
| | | LEFT TERMINAL | AMPLIFIER | SWITCH GROUP S101 | FILTER | RIGHT TERMINAL | LEFT TERMINAL | SWITCH GROUP S103 | AMPLIFIER | SWITCH GROUP S103 | FILTER | RIGHT TERMINAL |
| ANT1 | RECEPTION | R11 | LNA11 | S1-1 | BPF11 | A11 | — | — | — | — | — | — |
| ANT1 | TRANSMISSION (NORMAL) | T11 | PA11 | S1-2 | BPF11 | A11 | — | — | — | — | — | — |
| ANT1 | TRANSMISSION (SRS) | T11 | PA11 | S1-2 | BPF11 | A11 | — | — | — | — | — | — |
| ANT2 | RECEPTION | R12 | — | S1-4 | — | E11 | R21 | S3-2 | LNA21 | S3-3 | BPF21 | A21 |
| ANT2 | TRANSMISSION (SRS) | T11 | PA11 | S1-3 | — | E11 | R21 | S3-1 | — | — | BPF21 | A21 |

| ANTENNA | OPERATION | MODULE M1 | | | | | MODULE M2 | | | | | |
|---|---|---|---|---|---|---|---|---|---|---|---|---|
| | | LEFT TERMINAL | AMPLIFIER | SWITCH GROUP S1 | FILTER | RIGHT TERMINAL | LEFT TERMINAL | SWITCH GROUP S3 | AMPLIFIER | SWITCH GROUP S3 | FILTER | RIGHT TERMINAL |
| ANT1 | RECEPTION | R11 | LNA11 | S1-1 | BPF11 | A11 | — | — | — | — | — | — |
| ANT1 | TRANSMISSION (NORMAL) | T11 | PA11 | S1-2 | BPF11 | A11 | — | — | — | — | — | — |
| ANT1 | TRANSMISSION (SRS) | T11 | PA11 | S1-2 | BPF11 | A11 | — | — | — | — | — | — |
| ANT2 | RECEPTION | R12 | — | S1-4 | LPF11 | E11 | R21 | S3-1 | LNA21 | S3-3 | HPF21 | A21 |
| ANT2 | TRANSMISSION (SRS) | T11 | PA11 | S1-3 | LPF11 | E11 | R21 | S3-1 | — | — | HPF21 | A21 |

| ANTENNA | OPERATION | MODULE M1a | | | | | MODULE M2 | | | | | |
|---|---|---|---|---|---|---|---|---|---|---|---|---|
| | | LEFT TERMINAL | AMPLIFIER | SWITCH GROUP S1 | FILTER | RIGHT TERMINAL | LEFT TERMINAL | SWITCH GROUP S3 | AMPLIFIER | SWITCH GROUP S3 | FILTER | RIGHT TERMINAL |
| ANT1 | RECEPTION | R11 | LNA11 | S1-1 | BPF11 | A11 | - | - | - | - | - | - |
| ANT1 | TRANSMISSION (NORMAL) | T11 | PA11 | S1-2 | BPF11 | A11 | - | - | - | - | - | - |
| ANT1 | TRANSMISSION (SRS) | T11 | PA11 | S1-2 | BPF11 | A11 | - | - | - | - | - | - |
| ANT2 | RECEPTION | R12 | - | S1-4 | - | E11 | R21 | S3-2 | LNA21 | S3-3 | HPF21 | A21 |
| ANT2 | TRANSMISSION (SRS) | T11 | PA11 | S1-3 | LPF11 | E11 | R21 | S3-1 | - | - | HPF21 | A21 |

| ANTENNA | OPERATION | MODULE M1b | | | | | | MODULE M2a, M2b | | | | | |
|---|---|---|---|---|---|---|---|---|---|---|---|---|---|
| | | LEFT TERMINAL | AMPLIFIER | SWITCH GROUP S1 | FILTER | SWITCH GROUP S2 | RIGHT TERMINAL | LEFT TERMINAL | SWITCH GROUPS S3a, S3b | AMPLIFIER | SWITCH GROUPS S3a, S3b | FILTER | RIGHT TERMINAL |
| ANT1 | RECEPTION | R11 | LNA11 | S1-1 | BPF11 | — | A11 | — | — | — | — | — | — |
| ANT1 | TRANSMISSION (NORMAL) | T11 | PA11 | S1-2 | BPF11 | — | A11 | — | — | — | — | — | — |
| ANT1 | TRANSMISSION (SRS) | T11 | PA11 | S1-2 | BPF11 | — | A11 | — | — | — | — | — | — |
| ANT2 | RECEPTION | R12 | — | S1-4 | — | S2-7 | E11 | R21 | S3a-2 | LNA21 | S3a-3 | HPF21 | A21 |
| ANT2 | TRANSMISSION (SRS) | T11 | PA11 | S1-3 | LPF11 | S2-6 | E11 | R21 | S3a-1 | — | — | HPF21 | A21 |
| ANT3 | RECEPTION | R13 | — | S1-5 | — | S2-9 | E12 | R31 | S3b-2 | LNA31 | S3b-3 | HPF31 | A31 |
| ANT3 | TRANSMISSION (SRS) | T11 | PA11 | S1-3 | LPF11 | S2-8 | E12 | R31 | S3b-1 | — | — | HPF31 | A31 |

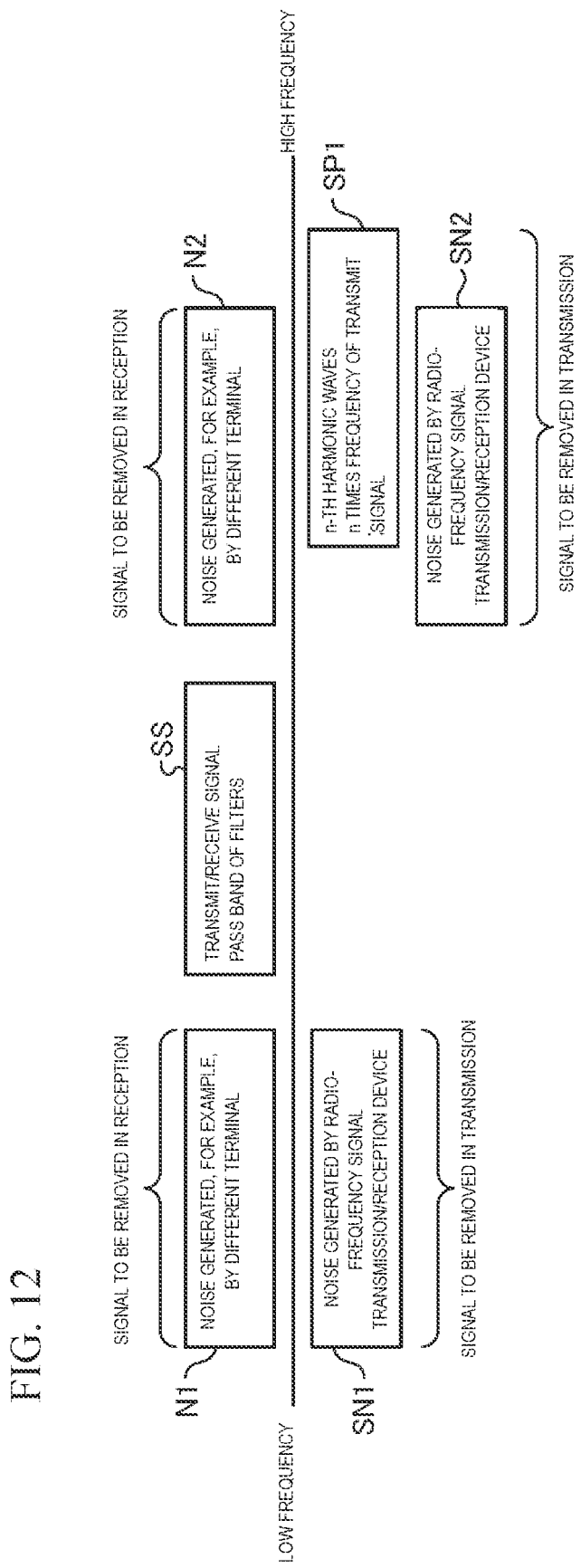

RADIO-FREQUENCY SIGNAL TRANSMISSION/RECEPTION CIRCUIT AND RADIO-FREQUENCY SIGNAL TRANSMISSION/RECEPTION DEVICE

CROSS REFERENCE TO RELATED APPLICATION

This application claims priority from Japanese Patent Application No. 2021-078131 filed on Apr. 30, 2021. The content of this application is incorporated herein by reference in its entirety.

BACKGROUND ART

The present disclosure relates to a radio-frequency signal transmission/reception circuit and a radio-frequency signal transmission/reception device.

In mobile communication devices exemplified by cellular phones, sound reference signaling (SRS) is performed. SRS refers to monitoring of the state of a transmission path between each antenna port in a mobile communication device and a base station.

"Remaining issues on SRS" (Apr. 16 to 20, 2018, 3GPP TSG RAN WG1 Meeting #92bis R1-1803749, [searched on March 29, H31], from www.3gpp.org/ftp/TSG_RAN/WG1_RL1/TSGR1_92b/Docs/R1-1803749.zip) describes SRS performed in a configuration of one transmission antenna and two reception antennas (hereinafter referred to as "1T2R"), a configuration of two transmission antennas and four reception antennas (hereinafter referred to as "2T4R"), and a configuration of one transmission antenna and four reception antennas (hereinafter referred to as "1T4R).

Japanese Unexamined Patent Application Publication No. 2020-182205 describes a radio-frequency signal transmission/reception device including two modules corresponding to two antennas. The radio-frequency signal transmission/reception device described in Japanese Unexamined Patent Application Publication No. 2020-182205 has band-pass filters included in the two respective modules. The band-pass filter included in one of the modules is used for transmission and reception.

The functions suitable for transmission are different from those suitable for reception. Thus, when a filter is used for transmission and reception, there is some point to be improved.

BRIEF SUMMARY

The present disclosure provides a radio-frequency signal transmission/reception circuit and a radio-frequency signal transmission/reception device which have an appropriate configuration in terms of transmission functions and reception functions.

A radio-frequency signal transmission/reception circuit according to one aspect of the present disclosure includes first to fifth terminals, a low-noise amplifier (LNA), a first switch (S1-1), a band-pass filter (BPF11), a power amplifier (PA11), a second switch (S1-2), a low-pass filter, a third switch (S1-3), and a fourth switch (S1-4). The low-noise amplifier (LNA) is connected, at its output terminal, to the first terminal (R11) electrically. The first switch (S1-1) is connected, at its first end, to the input terminal of the low-noise amplifier (LNA) electrically. The band-pass filter (BPF11) is connected, at its first end, to a second end of the first switch electrically, and is connected, at its second end, to a first antenna (ANT1) through the fourth terminal (A11) electrically. The power amplifier (PA11) is connected, at its input terminal, to the second terminal (T11) electrically. The second switch (S1-2) is connected, at its first end, to the output terminal of the power amplifier (PA11) electrically, and is connected, at its second end, to the first end of the band-pass filter electrically. The low-pass filter is connected, at its first end, to the fifth terminal (E11) electrically. The third switch (S1-3) is connected, at its first end, to the output terminal of the power amplifier (PA11) electrically, and is connected, at its second end, to a second end of the low-pass filter electrically. The fourth switch (S1-4) is connected, at its first end, to the third terminal (R12) electrically, and is connected, at its second end, to the low-pass filter electrically.

The present disclosure may achieve a radio-frequency signal transmission/reception device having an appropriate configuration in terms of transmission functions and reception functions.

BRIEF DESCRIPTION OF THE DRAWINGS

FIG. 2 is a diagram for describing operations of a radio-frequency signal transmission/reception device according to the comparison example;

FIG. 4 is a diagram for describing operations of a radio-frequency signal transmission/reception device according to the first embodiment;

FIG. 6 is a diagram for describing operations of a radio-frequency signal transmission/reception device according to the second embodiment;

FIG. 11 is a diagram for describing operations of a radio-frequency signal transmission/reception device according to the third embodiment; and FIG. 12 is a diagram illustrating an exemplary frequency band provided by a filter function used in the present disclosure.

DETAILED DESCRIPTION

Embodiments of a radio-frequency signal transmission/reception circuit and a radio-frequency signal transmission/reception device, which are provided by the present disclosure, will be described in detail below based on the drawings. The embodiments do not limit the present disclosure. Needless to say, the embodiments are exemplary, and partial replacement or combination of configurations in different embodiments may be made. In a second embodiment and its subsequent embodiments, points common to those in a first embodiment will not be described, and only different points will be described. In particular, substantially the same operation and effect caused by substantially the same configuration will not be described repeatedly.

First Embodiment

Before description about the first embodiment which will be made below, a comparison example will be described to facilitate understanding of the first embodiment.

Comparison Example

Figure 1:
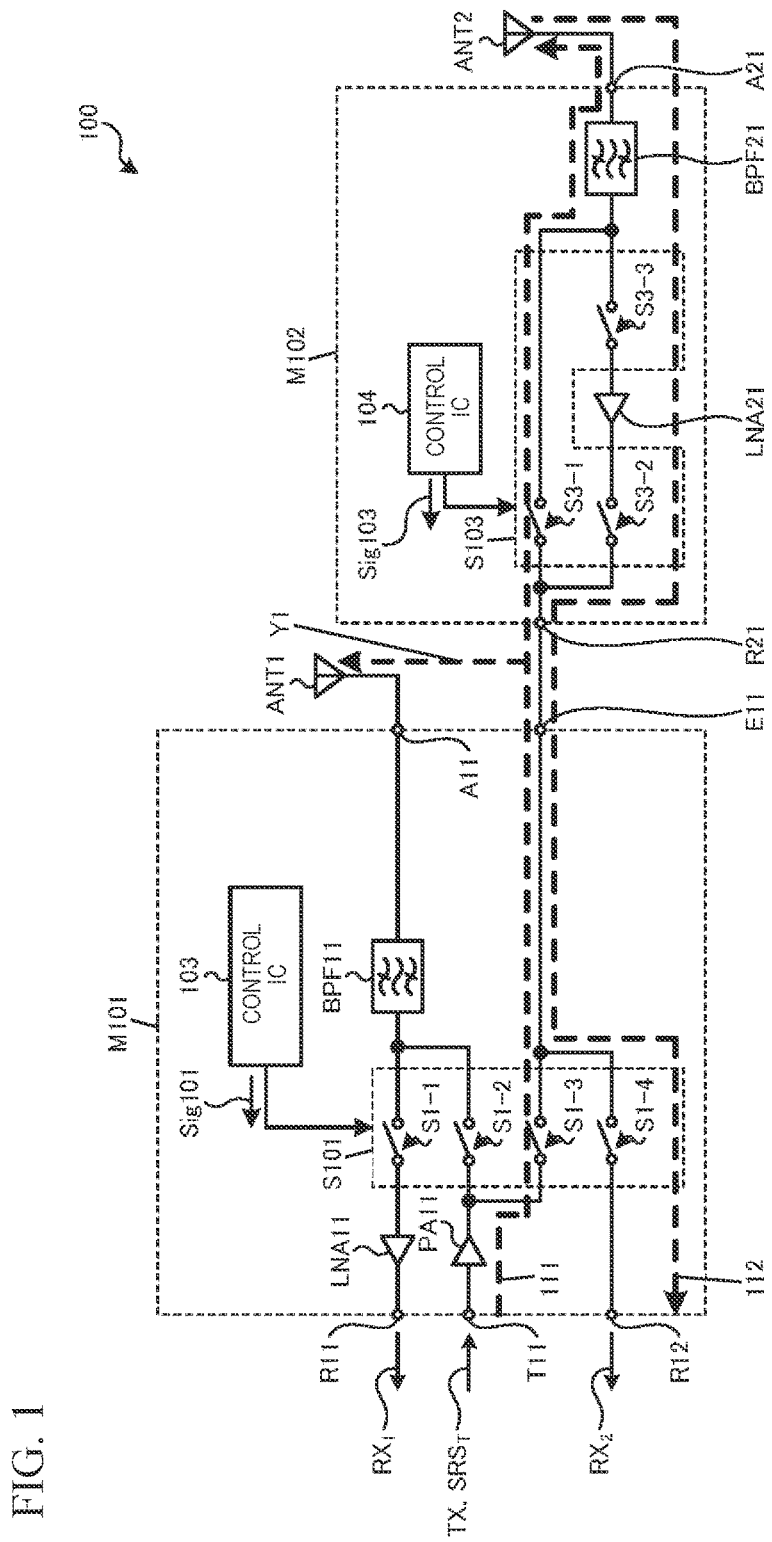
FIG. 1 is a diagram illustrating the circuit configuration of a radio-frequency signal transmission/reception device according to a comparison example.

FIG. 1 is a diagram illustrating the circuit configuration of a radio-frequency signal transmission/reception device according to the comparison example. A radio-frequency signal transmission/reception device 100 includes modules M101 and M102. The module M101 is connected to an antenna ANT1 electrically. The module M102 is connected to an antenna ANT2 electrically.

In normal communication, the radio-frequency signal transmission/reception device 100 supports 1T2R in which radio waves are transmitted from the antenna ANT1, and in which radio waves are received at the antennas ANT1 and ANT2. 2T4R may be supported with use of two radio-frequency signal transmission/reception devices 100.

In the present disclosure, the normal communication refers to communication, for example, of user data and voice, and refers to communication other than sound reference signaling (SRS).

In SRS communication, the radio-frequency signal transmission/reception device 100 transmits radio waves from the antenna ANT1. In SRS communication, the radio-frequency signal transmission/reception device 100 also transmits radio waves from the antenna ANT2. The antenna ANT2 is usually only for reception. In SRS, transmit signals from a power amplifier PA11 are transmitted from the antenna ANT2 to check the communication state between the antenna ANT2 and a base station.

The module M101 includes a switch group S101. The switch group S101 includes switches S1-3 and S1-4.

The module M101 includes terminals R11, T11, R12, A11, and E11, a low-noise amplifier LNA11, the power amplifier PA11, the switch group S101, a band-pass filter BPF11, and a control integrated circuit (IC) 103. The switch group S101 includes switches S1-1, S1-2, S1-3, and S1-4.

The low-noise amplifier LNA11 is connected, at its output terminal, to the terminal R11 electrically. The low-noise amplifier LNA11 is connected, at its input terminal, to a first end of the switch S1-1 electrically. The switch S1-1 is connected, at its second end, to a first end of the band-pass filter BPF11 electrically.

The power amplifier PA11 is connected, at its input terminal, to the terminal T11 electrically. The power amplifier PA11 is connected, at its output terminal, to a first end of the switch S1-2 electrically. The switch S1-2 is connected, at its second end, to the first end of the band-pass filter BPF11 electrically. The band-pass filter BPF11 is connected, at its second end, to the terminal A11 electrically. The terminal A11 is connected to the antenna ANT1 electrically.

The switch S1-3 is connected to, at its first end, to the output terminal of the power amplifier PA11 electrically. The switch S1-3 is connected, at its second end, to the terminal E11 electrically.

The switch S1-4 is connected, at its first end, to the terminal R12 electrically. The switch S1-4 is connected, to its second end, to the terminal E11 electrically.

Each switch in the switch group S101 is switched on or off based on a control signal Sig101 received from the control IC 103.

The module M102 includes terminals R21 and A21, a switch group S103, a low-noise amplifier LNA21, a band-pass filter BPF21, and a control IC 104. The switch group S103 includes switches S3-1, S3-2, and S3-3.

The switch S3-1 is connected, at its first end, to the terminal R21 electrically. The switch S3-1 is connected, at its second end, to a first end of the band-pass filter BPF21 electrically. The band-pass filter BPF21 is connected, at its second end, to the terminal A21 electrically.

The switch S3-2 is connected, at its first end, to the terminal R21 electrically. The switch S3-2 is connected, at its second end, to the output terminal of the low-noise amplifier LNA21 electrically. The low-noise amplifier LNA21 is connected, at its input terminal, to a first end of the switch S3-3 electrically. The switch S3-3 is connected, at its second end, to the first end of the band-pass filter BPF21 electrically. The band-pass filter BPF21 is connected, at its second end, to the terminal A21 electrically. The terminal A21 is connected to the antenna ANT2 electrically.

Each switch in the switch group S103 is switched on or off based on a control signal Sig103 received from the control IC 104.

The pass band of the band-pass filter BPF21 is the same as that of the band-pass filter BPF11. However, the present disclosure is not limited to this.

For example, the band-pass filter BPF11 is formed of one or more inductors and one or more capacitors. However, the present disclosure is not limited to this. The band-pass filter may be formed of a surface acoustic wave (SAW) device, a bulk acoustic wave (BAW) device, a dielectric device, or a distributed constant device. The band-pass filter BPF11 may be formed on or in a single substrate. However, the present disclosure is not limited to this. The low-noise amplifier LNA11 may be formed on a single semiconductor chip (die) which may be mounted on the substrate having the band-pass filter BPF11. However, the present disclosure is not limited to this. The power amplifier PA11 may be formed on a different single semiconductor chip which may be mounted on the substrate having the band-pass filter BPF11. However, the present disclosure is not limited to this. The switch group S101 may be formed on a different single semiconductor chip which may be mounted on the substrate having the band-pass filter BPF11. However, the present disclosure is not limited to this. The switch group S101 may be formed on the same semiconductor chip as that of the low-noise amplifier LNA11. The control IC 103 may be mounted on the substrate having the band-pass filter BPF11. However, the present disclosure is not limited to this.

For example, the band-pass filter BPF21 is formed of one or more inductors and one or more capacitors. However, the present disclosure is not limited to this. The band-pass filter BPF21 may be formed on or in a different single substrate. However, the present disclosure is not limited to this. The band-pass filter may be formed of a SAW device, a BAW device, a dielectric device, or a distributed constant device. The low-noise amplifier LNA21 may be formed on a single semiconductor chip which may be mounted on the substrate having the band-pass filter BPF21. However, the present disclosure is not limited to this. The switch group S103 may be formed on a different single semiconductor chip which may be mounted on the substrate having the band-pass filter BPF21. However, the present disclosure is not limited to this. The switch group S103 may be formed on the same semiconductor chip as that of the low-noise amplifier LNA21. The control IC 104 may be mounted on the substrate having the band-pass filter BPF21. However, the present disclosure is not limited to this.

FIG. 2 is a diagram for describing operations of a radio-frequency signal transmission/reception device according to the comparison example. Specifically, FIG. 2 is a diagram illustrating a table 120 describing which sites of the modules M101 and M102 are passed through by radio-frequency signals in (T) transmission and in (R) reception.

The case of (T) transmission includes (T-1-1) transmission (normal) using the antenna ANT1, (T-1-2) transmission (SRS) using the antenna ANT1, and (T-2) transmission (SRS) using the antenna ANT2.

The case of (R) reception includes (R-1) reception (normal) using the antenna ANT1, and (R-2) reception (normal) using the antenna ANT2.

The case of (T-1-1) transmission (normal) using the antenna ANT1 will be described. The second row 122 in the table 120 indicates the sites in the module M101, through which a radio-frequency transmit signal TX passes in transmission (normal) using the antenna ANT1.

In transmission (normal) using the antenna ANT1, the switches S1-1, S1-3, and S1-4 are switched off based on the control signal Sig101. The switch S1-2 is switched on based on the control signal Sig101.

A radio-frequency transmit signal TX is received at the terminal T11 which is a left terminal of the module M101. The power amplifier PA11 amplifies the radio-frequency transmit signal TX to output the amplified signal to the first end of the switch S1-2. The radio-frequency transmit signal TX, having passed through the switch S1-2, is received by the band-pass filter BPF11. The band-pass filter BPF11 band-passes the radio-frequency transmit signal TX. The radio-frequency transmit signal TX, having passed through the band-pass filter BPF11, is output to the antenna ANT1 through the terminal A11 which is a right terminal of the module M101.

The case of (T-1-2) transmission (SRS) using the antenna ANT1, which is substantially the same as the case of (T-1-1) transmission (normal) using the antenna ANT1, will not be described. The third row 123 in the table 120 indicates the sites in the module M101, through which an SRS transmit signal $SRS_T$ passes in SRS transmission using the antenna ANT1.

The case of (T-2) transmission (SRS) using the antenna ANT2 will be described. The fifth row 125 in the table 120 indicates the sites in the modules M101 and M102, through which an SRS transmit signal $SRS_T$ passes in transmission (SRS) using the antenna ANT2.

In transmission (SRS) using the antenna ANT2, the switches S1-1, S1-2, and S1-4 are switched off based on the control signal Sig101. The switch S1-3 is switched on based on the control signal Sig101. The switch S3-1 is switched on based on the control signal Sig103. The switches S3-2 and S3-3 are switched off based on the control signal Sig103.

An SRS transmit signal $SRS_T$ is received at the terminal T11 which is a left terminal of the module M101. The power amplifier PA11 amplifies the SRS transmit signal $SRS_T$ to output the amplified signal to the first end of the switch S1-3. The SRS transmit signal $SRS_T$, having passed through the switch S1-3, is received at the first end of the switch S3-1 through the terminal E11, which is a right terminal of the module M101, and the terminal R21, which is the left terminal of the module M102. The SRS transmit signal $SRS_T$, having passed through the switch S3-1, is received at the first end of the band-pass filter BPF21. The band-pass filter BPF21 band-passes the SRS transmit signal $SRS_T$. The SRS transmit signal $SRS_T$, having passed through the band-pass filter BPF21, is output to the antenna ANT2 through the terminal A21 which is the right terminal of the module M102.

The arrow 111 in FIG. 1 indicates the transmission path through which an SRS transmit signal $SRS_T$ passes. As illustrated by the arrow 111, an SRS transmit signal $SRS_T$ is transmitted through a path of the terminal T11, the power amplifier PA11, the switch S1-3, the terminal E11, the terminal R21, the switch S3-1, the band-pass filter BPF21, the terminal A21, to the antenna ANT2.

The case of (R-1) reception (normal) using the antenna ANT1 will be described. The first row 121 in the table 120 indicates the sites in the module M101, through which a radio-frequency receive signal $RX_1$ passes in reception (normal) using the antenna ANT1.

In reception (normal) using the antenna ANT1, the switch S1-1 is switched on based on the control signal Sig101. The switches S1-2, S1-3, and S1-4 are switched off based on the control signal Sig101.

A radio-frequency receive signal $RX_1$ is received at the second end of the band-pass filter BPF11 from the antenna ANT1 through the terminal A11 which is a right terminal of the module M101. The band-pass filter BPF11 band-passes the radio-frequency receive signal $RX_1$. The radio-frequency receive signal $RX_1$, having passed through the band-pass filter BPF11, is received at the second end of the switch S1-1. The low-noise amplifier LNA11 amplifies the radio-frequency receive signal $RX_1$, having passed through the switch S1-1, to output the amplified signal through the terminal R11 which is a left terminal of the module M101.

The case of (R-2) reception (normal) using the antenna ANT2 will be described. The fourth row 124 in the table 120 indicates the sites in the modules M101 and M102, through which a radio-frequency receive signal $RX_2$ passes in reception (normal) using the antenna ANT2.

In reception (normal) using the antenna ANT2, the switches S1-1, S1-2, and S1-3 are switched off based on the control signal Sig101. The switch S1-4 is switched on based on the control signal Sig101. The switch S3-1 is switch off based on the control signal Sig103. The switches S3-2 and S3-3 are switched on based on the control signal Sig103.

A radio-frequency receive signal $RX_2$ is received at the second end of the band-pass filter BPF21 from the antenna ANT2 through the terminal A21 which is the right terminal of the module M102. The band-pass filter BPF21 band-passes the radio-frequency receive signal $RX_2$. The radio-frequency receive signal $RX_2$, having passed through the band-pass filter BPF21, is received at the second end of the switch S3-3. The radio-frequency receive signal $RX_2$, having passed through the switch S3-3, is received at the input terminal of the low-noise amplifier LNA21. The low-noise amplifier LNA21 amplifies the radio-frequency receive signal $RX_2$ to output the amplified signal to the second end of the switch S3-2. The radio-frequency receive signal $RX_2$, having passed through the switch S3-2, is received at the second end of the switch S1-4 through the terminal R21, which is the left terminal of the module M102, and the terminal E11, which is a right terminal of the module M101. The radio-frequency receive signal $RX_2$, having passed through the switch S1-4, is output through the terminal R12 which is a left terminal of the module M101.

The arrow 112 in FIG. 1 indicates the transmission path through which a radio-frequency receive signal $RX_2$ passes.

As illustrated by the arrow 112, a radio-frequency receive signal RX$_2$ is transmitted through a path of the antenna ANT2, the terminal A21, the band-pass filter BPF21, the switch S3-3, the low-noise amplifier LNA21, the switch S3-2, the terminal R21, the terminal E11, the switch S1-4, to the terminal R12.

The band-pass filter BPF21 has both the functions of a transmit filter and the functions of a receive filter. Typically, suitable performance requirements for a transmit filter, such as removal of harmonic waves, are severer than those for a receive filter. Therefore, the passing loss of a transmit filter is larger than that of a receive-only filter. A transmit filter is larger in size than a receive-only filter. The configuration according to the comparison example, which is described by referring to FIGS. 1 and 2, needs to have the transmission functions, such as a function of removing harmonic waves. The transmission functions are optional for the receive path including the low-noise amplifier LNA21 which is originally used only for the antenna ANT2. Therefore, the passing loss of the band-pass filter BPF21 is increased, and the receiver sensitivity in passing through the low-noise amplifier LNA21 is degraded.

The configuration of the module M101 illustrated in FIG. 1 does not include a filter for removing noise, such as n-th harmonic waves, which is higher than the fundamental-wave signal. Therefore, a signal on the path between the terminal E11 and the terminal R21 includes this noise. In contrast, when isolation between the path from the terminal A11 to the antenna ANT1 and the path from the terminal E11 to the terminal R21 is worser than isolation between the band-pass filter BPF11 and the switch S1-2, which is off, the noise such as the n-th harmonic waves is introduced and is emitted from the antenna ANT1. The arrow Y1 in FIG. 1 indicates a path through which this noise is introduced.

First Embodiment

Figure 3:
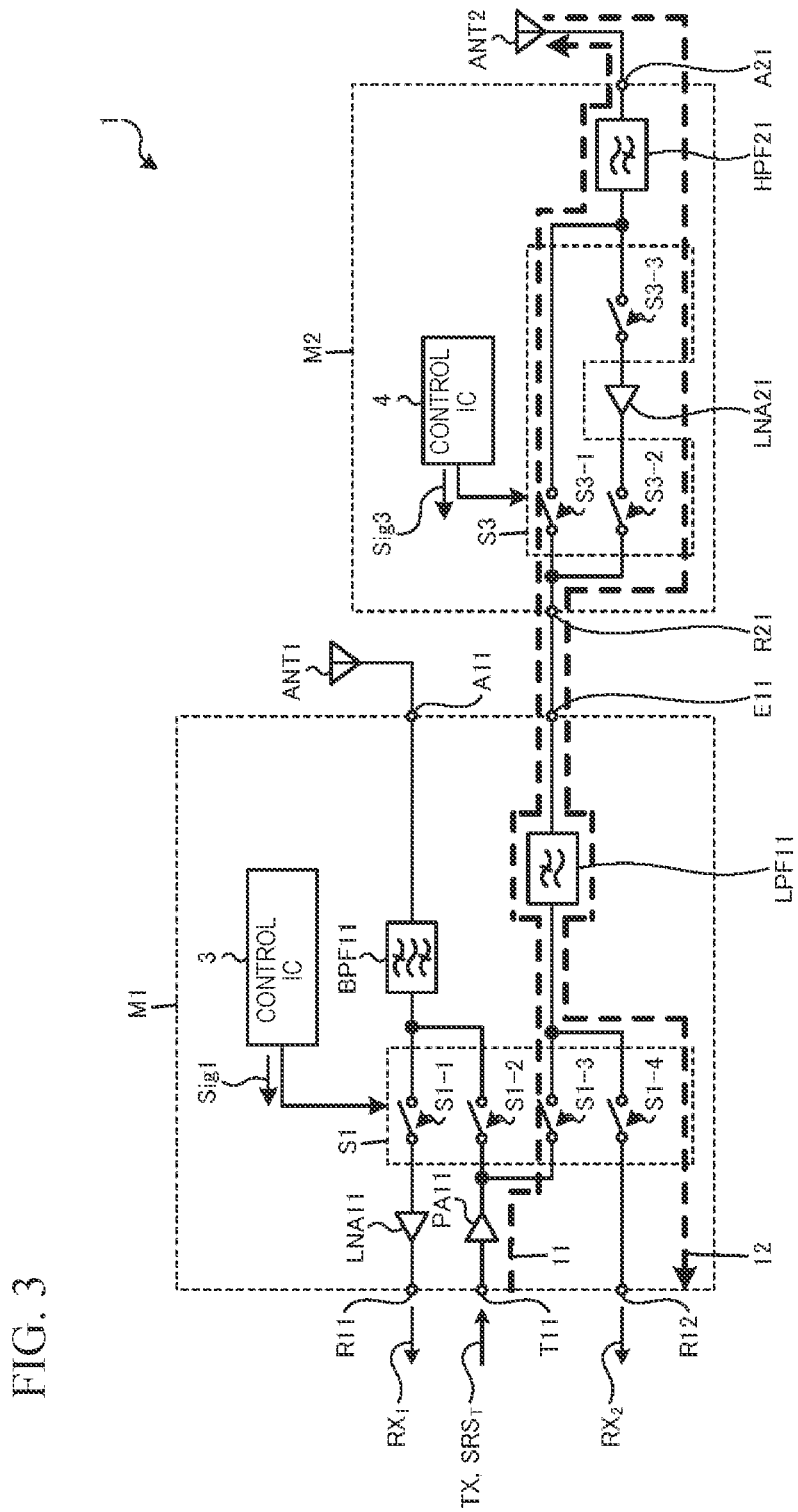
FIG. 3 is a diagram illustrating the circuit configuration of a radio-frequency signal transmission/reception device according to a first embodiment.

FIG. 3 is a diagram illustrating the circuit configuration of a radio-frequency signal transmission/reception device according to the first embodiment. A radio-frequency signal transmission/reception device 1 includes modules M1 and M2.

Among the components of the radio-frequency signal transmission/reception device 1, components identical to those of the radio-frequency signal transmission/reception device 100 according to the comparison example are designated with identical reference characters, and, as appropriate, will not be described.

The module M1 is connected to the antenna ANT1 electrically. The module M2 is connected to the antenna ANT2 electrically.

The antenna ANT1 corresponds to a "first antenna" provided by the present disclosure. The antenna ANT2 corresponds to a "second antenna" provided by the present disclosure.

Each of the modules M1 and M2 corresponds to a "radio-frequency signal transmission/reception circuit" provided by the present disclosure.

In normal transmission, the radio-frequency signal transmission/reception device 1 supports 1T2R in which radio waves are transmitted from the antenna ANT1, and in which radio waves are received at the antennas ANT1 and ANT2. 2T4R may be supported with use of two radio-frequency signal transmission/reception devices 1.

In the present disclosure, normal communication refers to communication, for example, of user data or voice, and refers to communication other than SRS.

In SRS communication, the radio-frequency signal transmission/reception device 1 transmits radio waves from the antenna ANT1. In SRS communication, the radio-frequency signal transmission/reception device 1 also transmits radio waves from the antenna ANT2.

The module M1 includes a low-pass filter LPF11. The module M1 includes a switch group S1 instead of the switch group S101 (see FIG. 1). The switch group S1 has functions equivalent to those of the switch group S101. The low-pass filter LPF11 removes signals in the frequency band higher than the frequency band of signals that are to be received/transmitted. The low-pass filter LPF11 corresponds to a "low-pass filter" provided by the present disclosure. Compared with the configuration (see FIG. 1) including a band-pass filter on the path, the filter may be reduced in size and the module size may be reduced.

The switch S1-3 is connected, at its first end, to the output terminal of the power amplifier PA11 electrically. The switch S1-3 is connected, at its second end, to a second end of the low-pass filter LPF11 electrically. The low-pass filter LPF11 is connected, at its first end, to the terminal E11 electrically.

The switch S1-4 is connected, at its first end, to the terminal R12 electrically. The switch S1-4 is connected, at its second end, to the second end of the low-pass filter LPF11. The low-pass filter LPF11 is connected, at its first end, to the terminal E11 electrically.

Each switch in the switch group S1 is switched on or off based on a control signal Sig1 received from a control IC 3.

In the module M1, the terminal R11 corresponds to a "first terminal" provided by the present disclosure. The terminal T11 corresponds to a "second terminal" provided by the present disclosure. The terminal R12 corresponds to a "third terminal" provided by the present disclosure. The terminal A11 corresponds to a "fourth terminal" provided by the present disclosure. The terminal E11 corresponds to a "fifth terminal" provided by the present disclosure. The switch S1-1 corresponds to a "first switch" according to the present disclosure. The switch S1-2 corresponds to a "second switch" provided by the present disclosure. The switch S1-3 corresponds to a "third switch" provided by the present disclosure. The switch S1-4 corresponds to a "fourth switch" provided by the present disclosure.

The module M2 includes a high-pass filter HPF21 instead of the band-pass filter BPF21 (see FIG. 1). In the module M2, the switch S3-1 is connected, at its second end, to a first end of the high-pass filter HPF21 electrically. The high-pass filter HPF21 is connected, at its second end, to the terminal A21 electrically. The high-pass filter HPF21 removes signals in a given frequency band, specifically, signals in a frequency band lower than the frequency band of signals that are to be received/transmitted. The high-pass filter HPF21 corresponds to a "high-pass filter" provided by the present disclosure.

The switch S3-3 is connected, at its first end, to the input terminal of the low-noise amplifier LNA21 electrically. The switch S3-3 is connected, at its second end, to the first end of the high-pass filter HPF21 electrically. The high-pass filter HPF21 is connected, at its second end, to the terminal A21 electrically.

Each switch in the switch group S3 is switched on or off based on a control signal Sig3 received from a control IC 4.

In the module M2, the terminal R21 corresponds to a "sixth terminal" provided by the present disclosure. The terminal A21 corresponds to a "seventh terminal" provided by the present disclosure. The switch S3-1 corresponds to a "fifth switch" provided by the present disclosure. The switch S3-2 corresponds to a "sixth switch" provided by the present disclosure. The switch S3-3 corresponds to a "seventh switch" provided by the present disclosure.

For example, the low-pass filter LPF11 is formed of one or more inductors and one or more capacitors. However, the present disclosure is not limited to this. The low-pass filter LPF11 may be formed of a SAW device, a BAW device, a dielectric device, or a distributed constant device. The low-pass filter LPF11 may be formed on or in a single substrate. However, the present disclosure is not limited to this. The low-noise amplifier LNA11 may be formed on a single semiconductor chip (die) which may be mounted on the substrate having the low-pass filter LPF11. However, the present disclosure is not limited to this. The power amplifier PA11 may be formed on a different single semiconductor chip which may be mounted on the substrate having the low-pass filter LPF11. However, the present disclosure is not limited to this. The switch group S1 may be formed on a different single semiconductor chip which may be mounted on the substrate having the low-pass filter LPF11. However, the present disclosure is not limited to this. The switch group S1 may be formed on the same semiconductor chip as that of the low-noise amplifier LNA11. The control IC 3 may be mounted on the substrate having the low-pass filter LPF11. However, the present disclosure is not limited to this.

For example, the high-pass filter HPF21 is formed of one or more inductors and one or more capacitors. However, the present disclosure is not limited to this. The high-pass filter HPF21 may be formed on or in a different single substrate. However, the present disclosure is not limited to this. The high-pass filter HPF21 may be formed of a SAW device, a BAW device, a dielectric device, or a distributed constant device. The low-noise amplifier LNA21 may be formed on a single semiconductor chip which may be mounted on the substrate having the high-pass filter HPF21. However, the present disclosure is not limited to this. The switch group S3 may be formed on a different single semiconductor chip which may be mounted on the substrate having the high-pass filter HPF21. However, the present disclosure is not limited to this. The switch group S3 may be formed on the same semiconductor chip as that of the low-noise amplifier LNA21. The control IC 4 may be mounted on the substrate having the high-pass filter HPF21. However, the present disclosure is not limited to this.

FIG. 4 is a diagram for describing operations of a radio-frequency signal transmission/reception device according to the first embodiment. Specifically, FIG. 4 is a diagram illustrating a table 20 describing which sites in the modules M1 and M2 are passed through by radio-frequency signals in (T) transmission and in (R) reception.

The case of (T) transmission includes (T-1-1) transmission (normal) using the antenna ANT1, (T-1-2) transmission (SRS) using the antenna ANT1, and (T-2) transmission (SRS) using the antenna ANT2.

The case of (R) reception includes (R-1) reception (normal) using the antenna ANT1, and (R-2) reception (normal) using the antenna ANT2.

The case of (T-1-1) transmission (normal) using the antenna ANT1 will be described. The second row 22 in the table 20 indicates the sites in the module M1, through which a radio-frequency transmit signal TX passes in transmission (normal) using the antenna ANT1.

In transmission (normal) using the antenna ANT1, the switches S1-1, S1-3, and S1-4 are switched off based on the control signal Sig1. The switch S1-2 is switched on based on the control signal Sig1.

A radio-frequency transmit signal TX is received at the terminal T11 which is a left terminal of the module M1. The power amplifier PA11 amplifies the radio-frequency transmit signal TX to output the amplified signal to the first end of the switch S1-2. The radio-frequency transmit signal TX, having passed through the switch S1-2, is received by the band-pass filter BPF11. The band-pass filter BPF11 band-passes the radio-frequency transmit signal TX. The radio-frequency transmit signal TX, having passed through the band-pass filter BPF11, is output to the antenna ANT1 through the terminal A11 which is a right terminal of the module M1.

The case of (T-1-2) transmission (SRS) using the antenna ANT1 is substantially the same as the case of (T-1-1) transmission (normal) using the antenna ANT1, and will not be described. The third row 23 in the table 20 indicates the sites in the module M1, through which an SRS transmit signal $SRS_T$ passes in SRS transmission using the antenna ANT1.

The case of (T-2) transmission (SRS) using the antenna ANT2 will be described. The fifth row 25 in the table 20 indicates the sites in the modules M1 and M2, through which an SRS transmit signal $SRS_T$ passes in transmission (SRS) using the antenna ANT2.

In transmission (SRS) using the antenna ANT2, the switches S1-1, S1-2, and S1-4 are switched off based on the control signal Sig1. The switch S1-3 is switched on based on the control signal Sig1. The switch S3-1 is switched on based on the control signal Sig3. The switches S3-2 and S3-3 are switched off based on the control signal Sig3.

An SRS transmit signal $SRS_T$ is received at the terminal T11 which is a left terminal of the module M1. The power amplifier PA11 amplifies the SRS transmit signal $SRS_T$ to output the amplified signal to the first end of the switch S1-3. The SRS transmit signal $SRS_T$, having passed through the switch S1-3, is received at the first end of the low-pass filter LPF11. The low-pass filter LPF11 low-passes the SRS transmit signal $SRS_T$. That is, frequency components, which are higher than the cutoff frequency of the low-pass filter LPF11, are removed from the SRS transmit signal $SRS_T$. The SRS transmit signal $SRS_T$, having passed through the low-pass filter LPF11, is input to the first end of the switch S3-1 through the terminal E11, which is a right terminal of the module M1, and the terminal R21, which is the left terminal of the module M2.

The SRS transmit signal $SRS_T$, having passed through the switch S3-1, is received at the first end of the high-pass filter HPF21. The high-pass filter HPF21 high-passes the SRS transmit signal $SRS_T$. That is, frequency components, which are lower than the cutoff frequency of the high-pass filter HPF21, are removed from the SRS transmit signal $SRS_T$. The SRS transmit signal $SRS_T$, having passed through the high-pass filter HPF21, is output to the antenna ANT2 through the terminal A21 which is the right terminal of the module M2.

The arrow 11 in FIG. 3 indicates the transmission path through which an SRS transmit signal $SRS_T$ passes. As illustrated by the arrow 11, an SRS transmit signal $SRS_T$ is transmitted through a path of the terminal T11, the power amplifier PA11, the switch S1-3, the low-pass filter LPF11, the terminal E11, the terminal R21, the switch S3-1, the high-pass filter HPF21, the terminal A21, to the antenna ANT2.

The case of (R-1) reception (normal) using the antenna ANT1 will be described. The first row 21 in the table 20 indicates the sites in the module M1, through which a radio-frequency receive signal $RX_1$ passes in reception (normal) using the antenna ANT1.

In reception (normal) using the antenna ANT1, the switch S1-1 is switched on based on the control signal Sig1. The switches S1-2, S1-3, and S1-4 are switched off based on the control signal Sig1.

A radio-frequency receive signal $RX_1$ is received at the second end of the band-pass filter BPF11 from the antenna ANT1 through the terminal A11 which is a right terminal of the module M1. The band-pass filter BPF11 band-passes the radio-frequency receive signal $RX_1$. The radio-frequency receive signal $RX_1$, having passed through the band-pass filter BPF11, is received at the second end of the switch S1-1. The low-noise amplifier LNA11 amplifies the radio-frequency receive signal $RX_1$, having passed through the switch S1-1, to output the amplified signal through the terminal R11 which is a left terminal of the module M1.

The case of (R-2) reception (normal) using the antenna ANT2 will be described. The fourth row 24 in the table 20 indicates the sites in the modules M1 and M2, through which a radio-frequency receive signal $RX_2$ passes in reception (normal) using the antenna ANT2.

In reception (normal) using the antenna ANT2, the switches S1-1, S1-2, and S1-3 are switched off based on the control signal Sig1. The switch S1-4 is switched on based on the control signal Sig1. The switch S3-1 is switched off based on the control signal Sig3. The switches S3-2 and S3-3 are switched on based on the control signal Sig3.

A radio-frequency receive signal $RX_2$ is received at the second end of the high-pass filter HPF21 from the antenna ANT2 through the terminal A21 which is the right terminal of the module M2. The high-pass filter HPF21 high-passes the radio-frequency receive signal $RX_2$. The radio-frequency receive signal $RX_2$, having passed through the high-pass filter HPF21, is received at the second end of the switch S3-3. The radio-frequency receive signal $RX_2$, having passed through the switch S3-3, is received at the input terminal of the low-noise amplifier LNA21. The low-noise amplifier LNA21 amplifies the radio-frequency receive signal $RX_2$ to output the amplified signal to the second end of the switch S3-2. The radio-frequency receive signal $RX_2$, having passed through the switch S3-2, is received at the first end of the low-pass filter LPF11 through the terminal R21, which is the left terminal of the module M2, and the terminal E11, which is a right terminal of the module M1. The low-pass filter LPF11 low-passes the radio-frequency receive signal $RX_2$. The radio-frequency receive signal $RX_2$, having passed through the low-pass filter LPF11, is received at the second end of the switch S1-4. The radio-frequency receive signal $RX_2$, having passed through the switch S1-4, is output through the terminal R12 which is a left terminal of the module M1.

The arrow 12 in FIG. 3 indicates the transmission path through which a radio-frequency receive signal $RX_2$ passes. As illustrated by the arrow 12, a radio-frequency receive signal $RX_2$ is transmitted through a path of the antenna ANT2, the terminal A21, the high-pass filter HPF21, the switch S3-3, the low-noise amplifier LNA21, the switch S3-2, the terminal R21, the terminal E11, the low-pass filter LPF11, the switch S1-4, to the terminal R12.

In the first embodiment described above, a filter function, which is implemented through combination of the low-pass filter LPF11 in the module M1 and the high-pass filter HPF21 in the module M2, is used for the transmit path using the antenna ANT2. In this configuration, the high-pass filter HPF21 in the module M2 does not have an optional function for transmission, for example, a function of removing harmonic waves. That is, the high-pass filter HPF21 disposed in the module M2 is not required to remove frequencies higher than the frequency band of transmit signals. Therefore, the high-pass filter HPF21, having a limited frequency band that is to be removed, may be used. Thus, the passing loss of the high-pass filter HPF2/ may be decreased, and the receiver sensitivity may be improved.

The terminal E11 of the module M1 is connected to the terminal R21 of the module M2 by using a radio-frequency line. The comparison example described by referring to FIG. 1 does not include the low-pass filter LPF11. Therefore, signals on a radio-frequency line between terminal E11 and the terminal R21 include noise such as n-th harmonic waves. In contrast, according to the first embodiment described by referring to FIG. 3, noise such as n-th harmonic waves is removed by the low-pass filter LPF11. Thus, signals on the radio-frequency line between the terminal E11 and the terminal R21 do not include harmonic wave noise. Therefore, unlike the case according to the comparison example, the first embodiment has an advantageous effect that noise (the arrow Y1 in FIG. 1) does not leak to the outside of the module M1.

Typically, compared with a high-pass filter which removes only signals on the low frequency side of the pass band, a band-pass filter, which removes both signals on the low frequency side and the high frequency side of the pass band, has a larger signal loss in the pass band. That is, compared with the comparison example (FIG. 1), the first embodiment (FIG. 3) has a lower noise figure (NF) which determines the reception performance.

For simplicity, it is assumed that, since the transmission paths obtained through setting of switches are the same, the transmission paths may be ignored. The noise figure for the path from the terminal A21 to the terminal R12 is obtained as follows. That is, it is assumed that the gain of the low-noise amplifier LNA21 is equal to 10 dB, and the noise gain (NG) is equal to 2 dB; the loss of the band-pass filter BPF21 is equal to 2 dB; the loss of the high-pass filter HPF21 is equal to 1 dB; the loss of the low-pass filter LPF11 is equal to 1 dB.

In the case of the comparison example (FIG. 1), the amplification factor (gain) is 8 dB (=−2 dB+10 dB); in the case of the first embodiment (FIG. 3), the amplification factor (gain) is 8 dB (−1 dB+10 dB−1 dB). However, in the case of the comparison example (FIG. 1), the noise figure is 4 dB; in the case of the first embodiment (FIG. 3), the noise figure is 3 dB.

Here, the noise factor F is defined as follows: $F=F_1+((F_2-1)/G_1)+((F_3-1)/G_1G_2)+ \ldots +((F_N-1)/G_1G_2 \ldots G_N)$ where the gains of amplifiers, whose number is N (N is a natural number), are $G_1, G_2, \ldots, G_N$. The noise figure may be expressed as 10 log(F).

Second Embodiment

Figure 5:
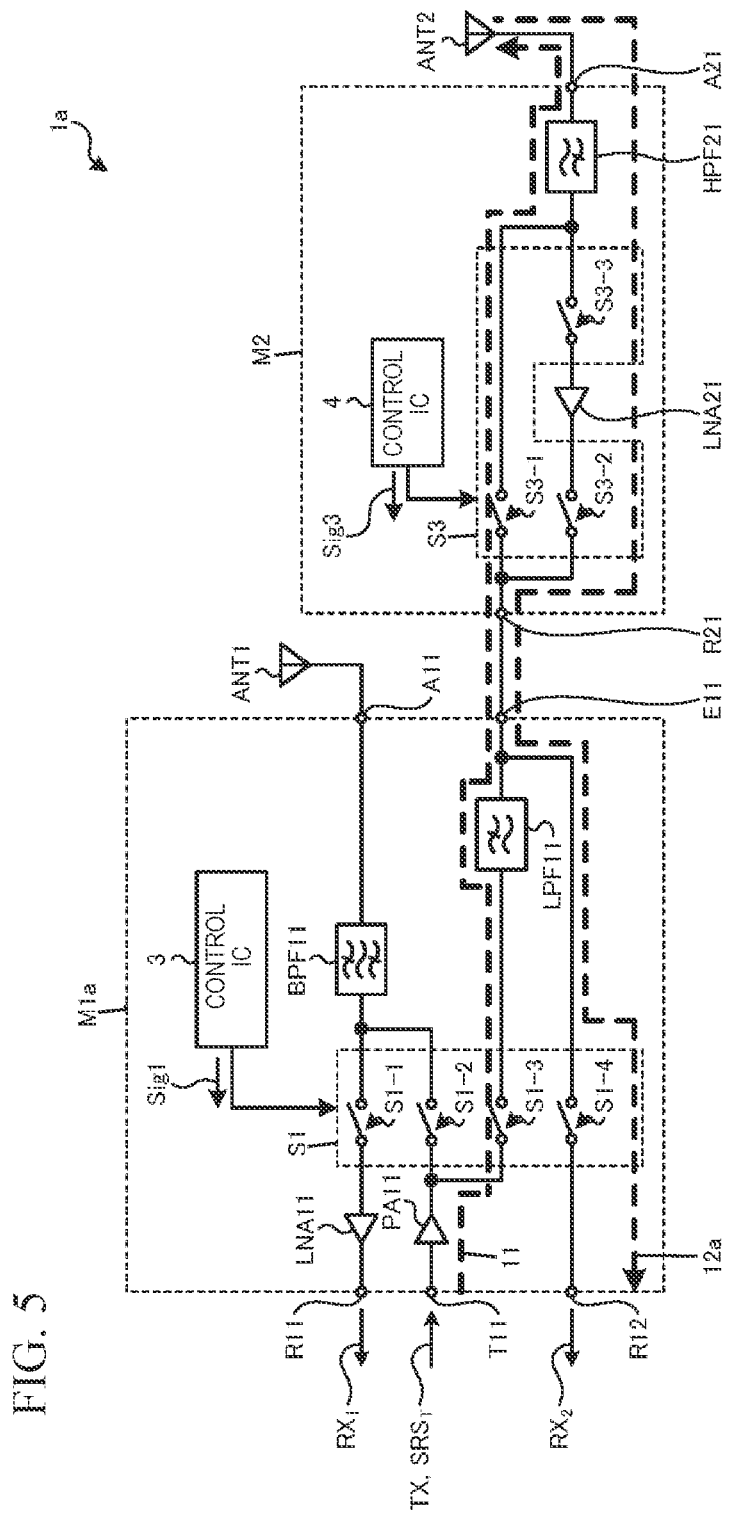
FIG. 5 is a diagram illustrating the circuit configuration of a radio-frequency signal transmission/reception device according to a second embodiment.

FIG. 5 is a diagram illustrating the circuit configuration of a radio-frequency signal transmission/reception device according to the second embodiment. A radio-frequency signal transmission/reception device 1a according to the second embodiment includes modules M1a and M2. In the module M1a, the switch S1-4 is directly connected, at its second end, to the terminal E11 not through the low-pass filter LPF11. The radio-frequency signal transmission/reception device 1a is different from the radio-frequency signal transmission/reception device 1 according to the first embodiment in this point. The other configuration of the radio-frequency signal transmission/reception device 1a is substantially the same as that of the radio-frequency signal transmission/reception device 1 according to the first embodiment described by referring to FIG. 3.

The radio-frequency signal transmission/reception device 1*a* according to the second embodiment has an effect that the receiver sensitivity and the noise figure are improved, since the receive path from the antenna ANT2 to the terminal R12 does not include the low-pass filter LPF11.

FIG. 6 is a diagram for describing operations of a radio-frequency signal transmission/reception device according to the second embodiment. Specifically, FIG. 6 is a diagram illustrating a table 20*a* describing which sites in modules M1*a* and M2 are passed through by radio-frequency signals in (T) transmission and in (R) reception.

The case of (T) transmission includes (T-1-1) transmission (normal) using the antenna ANT1, (T-1-2) transmission (SRS) using the antenna ANT1, and (T-2) transmission (SRS) using the antenna ANT2.

The case of (R) reception includes (R-1) reception (normal) using the antenna ANT1, and (R-2) reception (normal) using the antenna ANT2.

In FIG. 6, the case of (T-1-1) transmission (normal) using the antenna ANT1, the case of (T-1-2) transmission (SRS) using the antenna ANT1, the case of (T-2) transmission (SRS) using the antenna ANT2, and the case of (R-1) reception (normal) using the antenna ANT1 are substantially the same as those described by referring to FIG. 4, and will not be described.

The case of (R-2) reception (normal) using the antenna ANT2 will be described. The fourth row 24*a* in the table 20*a* indicates the sites in the modules M1*a* and M2, through which a radio-frequency receive signal $RX_2$ passes in reception (normal) using the antenna ANT2.

In reception (normal) using the antenna ANT2, the switches S1-1, S1-2, and S1-3 are switched off based on the control signal Sig1. The switch S1-4 is switched on based on the control signal Sig1. The switch S3-1 is switched off based on the control signal Sig3. The switches S3-2 and S3-3 are switched on based on the control signal Sig3.

A radio-frequency receive signal $RX_2$ is received at the second end of the high-pass filter HPF21 from the antenna ANT2 through the terminal A21 which is the right terminal of the module M2. The high-pass filter HPF21 high-passes the radio-frequency receive signal $RX_2$. The radio-frequency receive signal $RX_2$, having passed through the high-pass filter HPF21, is received at the second end of the switch S3-3. The radio-frequency receive signal $RX_2$, having passed through the switch S3-3, is received at the input terminal of the low-noise amplifier LNA21. The low-noise amplifier LNA21 amplifies the radio-frequency receive signal $RX_2$ to output the amplified signal to the second end of the switch S3-2. The radio-frequency receive signal $RX_2$, having passed through the switch S3-2, is received at the second end of the switch S1-4 through the terminal R21, which is the left terminal of the module M2, and the terminal E11, which is a right terminal of the module M1*a*. Unlike FIG. 4, the radio-frequency receive signal $RX_2$ is not received by the low-pass filter LPF11. The radio-frequency receive signal $RX_2$, having passed through the switch S1-4, is output through the terminal R12 which is a left terminal of the module M1*a*.

The arrow 12*a* in FIG. 5 indicates the transmission path through which a radio-frequency receive signal $RX_2$ passes. As illustrated by the arrow 12, a radio-frequency receive signal $RX_2$ is transmitted through a path of the antenna ANT2, the terminal A21, the high-pass filter HPF21, the switch S3-3, the low-noise amplifier LNA21, the switch S3-2, the terminal R21, the terminal E11, the switch S1-4, to the terminal R12.

In the second embodiment described above, a filter function, which is implemented through combination of the low-pass filter LPF11 in the module M1*a* and the high-pass filter HPF21 in the module M2, is used for the transmit path using the antenna ANT2. In this configuration, the high-pass filter HPF21 in the module M2 does not have an optional function for transmission, for example, a function of removing harmonic waves. Therefore, the passing loss of the high-pass filter HPF21 is decreased, and the receiver sensitivity is improved.

In the second embodiment, unlike the first embodiment, the receive path using the antenna ANT2 does not have the low-pass filter LPF11 in the module M1*a*. Therefore, the passing loss caused by the low-pass filter LPF11 is eliminated, achieving further improved receiver sensitivity and a decreased noise figure.

Figure 7:
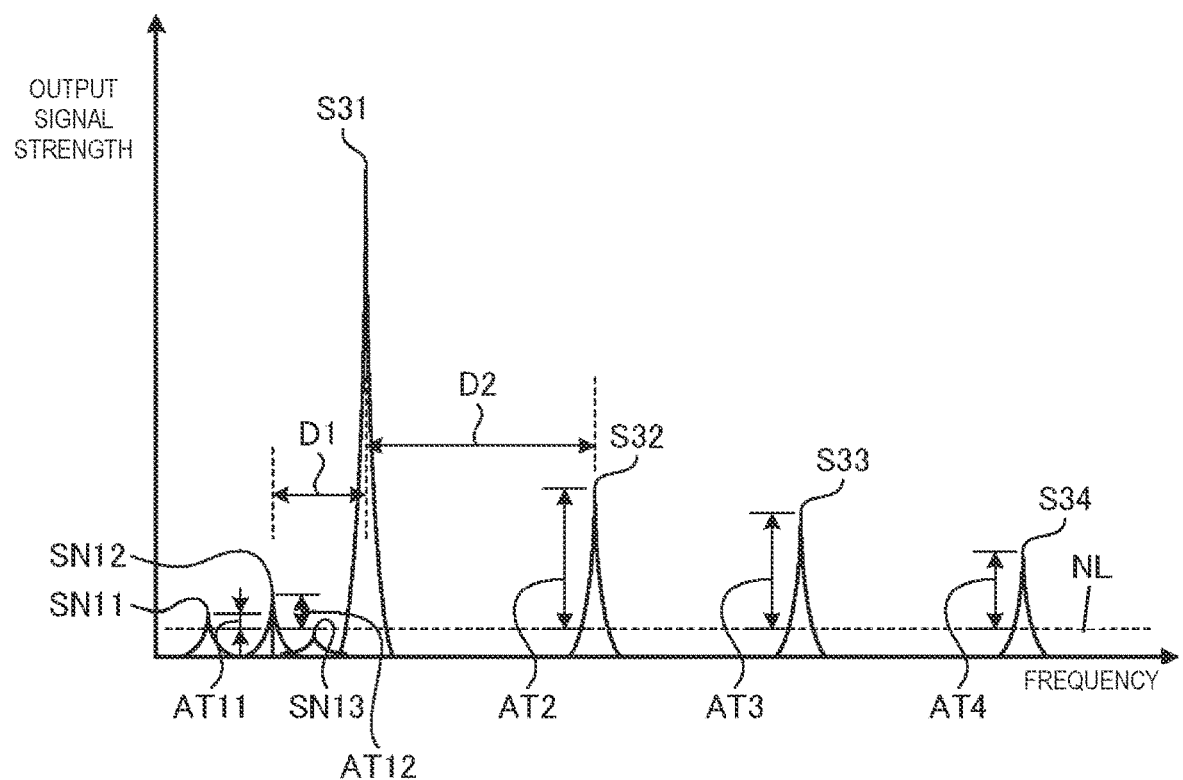
FIG. 7 is a diagram illustrating the relationship between frequency and output signal strength of a power amplifier.

The effect of the second embodiment will be further described by referring to FIG. 7. FIG. 7 is a diagram illustrating an exemplary relationship between frequency and output signal strength of the power amplifier PA11. FIG. 7 illustrates frequency components included in an output signal from the power amplifier PA11. A fundamental-wave signal S31 included in the output signal is to be transmitted. The output signal from the power amplifier PA11 includes a second harmonic wave signal S32, a third harmonic wave signal S33, and a fourth harmonic wave signal S34, which are generated with respect to the fundamental-wave signal S31. The fundamental-wave signal S3*l* has the highest level. The levels of the second harmonic wave signal S32, the third harmonic wave signal S33, and the fourth harmonic wave signal S34 are decreased in this sequence. The second harmonic wave signal S32, the third harmonic wave signal S33, and the fourth harmonic wave signal S34 are to be removed. In the example illustrated in FIG. 7, noise SN11, noise SN12, and noise SN13 are present in the frequency band lower than that of the fundamental-wave signal S31.

A level NL indicates the allowable noise level, for example, in a radio law. The level of the noise SN11 is higher than the level NL. The level of the noise SN12 is higher than the level NL. The level of the noise SN13 is lower than the level NL. Therefore, in the radio-frequency signal transmission/reception device, the noise SN11 and the noise SN12 other than the noise SN13 need to be decreased to a level equal to or lower than the level NL. In order to decrease the level of the noise SN11 to the level NL, the attenuation of the high-pass filter HPF2*l* needs to be set to an attenuation AT11, in FIG. 7, or greater. In order to decrease the level of the noise SN12 to the level NL, the attenuation of the high-pass filter HPF2*l* needs to be set to an attenuation AT12, in FIG. 7, or greater.

In the radio-frequency signal transmission/reception device, the level of the harmonic wave signals other than the fundamental-wave signal S3*l* need to be decreased to a level equal to or lower than the level NL. In order to decrease the level of the second harmonic wave signal S32 to the level NL, the attenuation of the low-pass filter LPF11 needs to be set to an attenuation AT2, in FIG. 7, or greater. In order to decrease the level of the third harmonic wave signal S33 to the level NL, the attenuation of the low-pass filter LPF11 needs to be set to an attenuation AT3, in FIG. 7, or greater. In order to decrease the level of the fourth harmonic wave signal S34 to the level NL, the attenuation of the low-pass filter LPF11 needs to be set to an attenuation AT4, in FIG. 7, or greater.

The distance D1 in FIG. 7 is the difference in frequency between the fundamental-wave signal S31, which is to be transmitted, and the noise SN12, which is closest to the fundamental-wave signal S31 and whose level is equal to or higher than the level NL. The distance D2 is the difference in frequency between the fundamental-wave signal S31, which is to be transmitted, and the second harmonic wave signal S32, which is the harmonic wave closest to the fundamental-wave signal S31.

Figure 8:
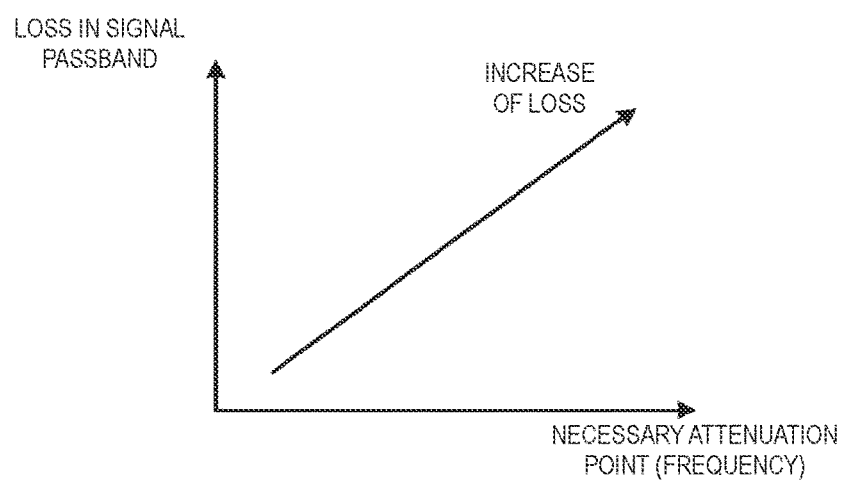
FIG. 8 is a diagram illustrating the relationship between suitable attenuation point in a signal passband, and loss in the signal passband.

FIG. 8 is a diagram illustrating the relationship between suitable attenuation point in a signal passband and loss in the signal passband. Specifically, a suitable attenuation point in a signal passband refers to a frequency value. Typically, as illustrated in FIG. 8, as the count of suitable attenuation points is increased, the loss in the signal passband is increased.

Figure 9:
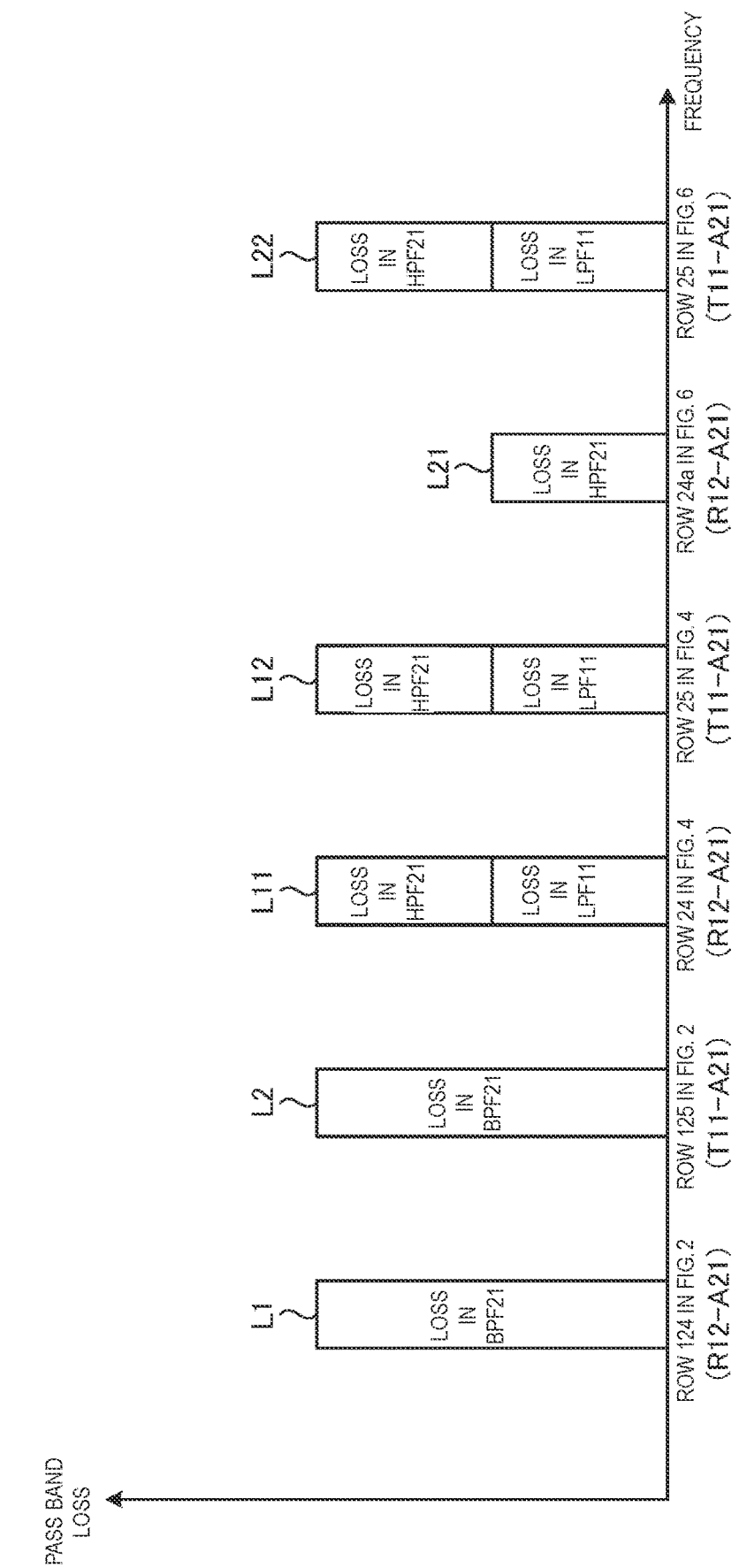
FIG. 9 is a diagram for describing comparison between losses in radio-frequency signal transmission/reception devices.

The effect of the second embodiment will be further described by referring to FIG. 9. FIG. 9 is a diagram for describing comparison between the losses in radio-frequency signal transmission/reception devices. In FIG. 9, the horizontal axis represents frequency, and the vertical axis represents band pass loss at the frequency. In FIG. 9, the loss of each switch is assumed to be zero.

loss L1 and loss L2 indicate losses in a radio-frequency signal transmission/reception device according to the comparison example described by referring to FIG. 1. The loss L1 corresponds to the loss for the fourth row 124 in the table 120 in FIG. 2. That is, the loss L1 corresponds to the loss for the path from the terminal R12 to the terminal A21 in FIG. 1. The loss L2 corresponds to the loss for the fifth row 125 in the table 120 in FIG. 2. That is, the loss L2 corresponds to the loss for the path from the terminal T11 to the terminal A21 in FIG. 1.

Loss L11 and loss L12 indicate losses in a radio-frequency signal transmission/reception device according to the first embodiment described by referring to FIG. 3. The loss L11 corresponds to the loss for the fourth row 24 in the table 20 in FIG. 4. That is, the loss L11 corresponds to the loss for the path from the terminal R12 to the terminal A21 in FIG. 3. The loss L12 corresponds to the loss for the fifth row 25 in the table 20 in FIG. 4. That is, the loss L12 corresponds to the loss for the path from the terminal T11 to the terminal A21 in FIG. 3.

loss L21 and loss L22 indicate losses in a radio-frequency signal transmission/reception device according to the second embodiment described by referring to FIG. 5. The loss L21 corresponds to the loss for the fourth row 24a in the table 20a in FIG. 6. That is, the loss L21 corresponds to the loss for the path from the terminal R12 to the terminal A21 in FIG. 5. The loss L22 corresponds to the loss for the fifth row 25 in the table 20a in FIG. 6. That is, the loss L12 corresponds to the loss for the path from the terminal T11 to the terminal A21 in FIG. 5.

In FIG. 9, the loss L1 and the loss L2 include the loss caused by the band-pass filter BPF21. The loss L11 includes the loss caused by the low-pass filter LPF11 and the loss caused by the high-pass filter HPF21. The loss L11 and the loss L1 are almost in the same level. The loss L12 includes the loss caused by the low-pass filter LPF11 and the loss caused by the high-pass filter HPF21. The loss L12 and the loss L2 are almost in the same level.

In FIG. 9, the loss L21 includes the loss caused by the high-pass filter HPF21. The loss L21 does not include the loss caused by the low-pass filter LPF11 through which signals do not pass. The loss L22 includes the loss caused by the low-pass filter LPF11 and the loss caused by the high-pass filter HPF21. The loss L22 and the loss L2 are almost in the same level.

As illustrated in FIG. 9, the transmission path (the arrow 12a), through which a radio-frequency receive signal $RX_2$ passes in a radio-frequency signal transmission/reception device according to the second embodiment described by referring to FIGS. 5 and 6, has an advantage in view of having a low loss. That is, the passing loss caused by the low-pass filter LPF11 is eliminated, achieving further improved receiver sensitivity and a decreased noise figure.

Third Embodiment

Figure 10:
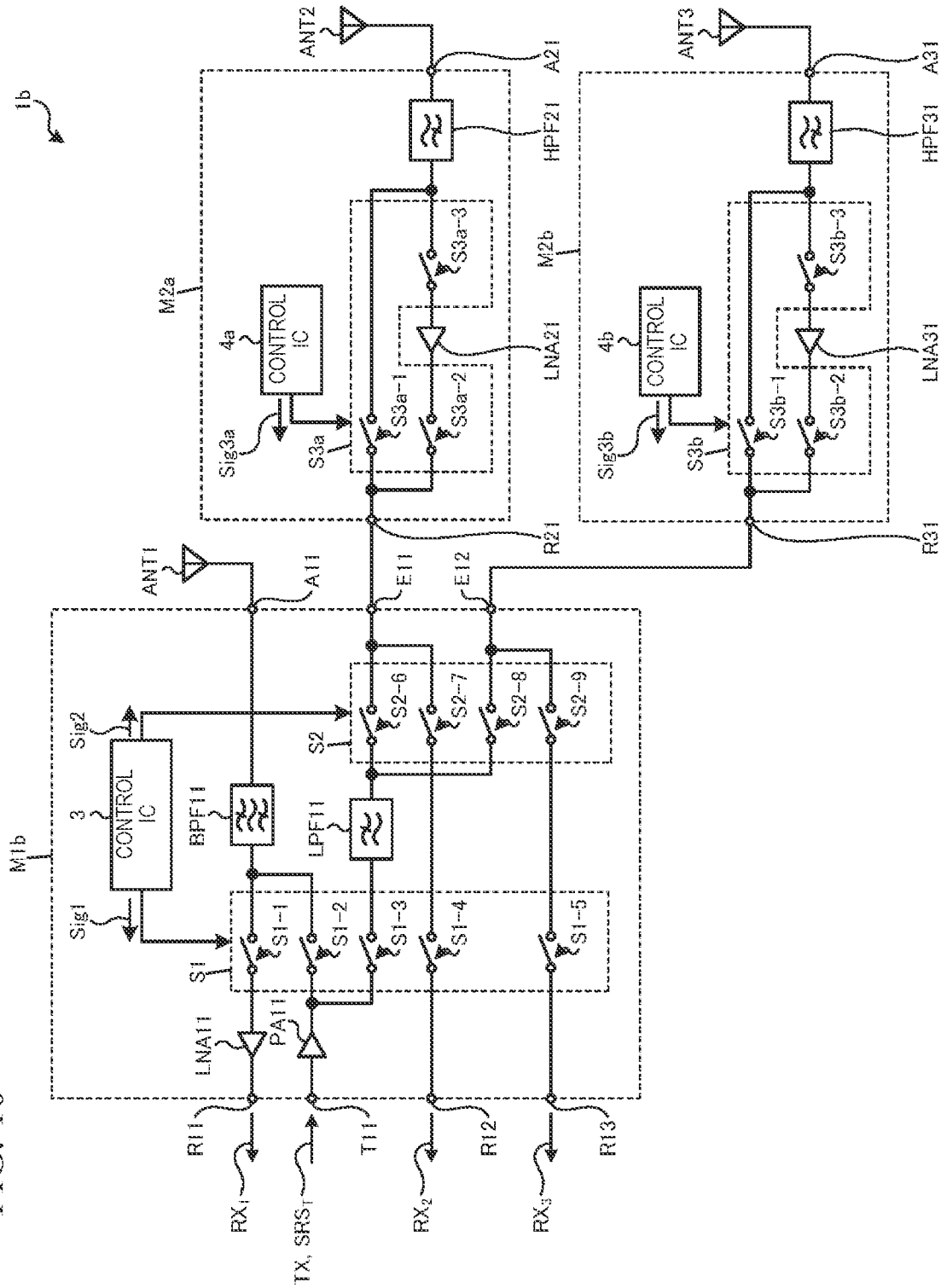
FIG. 10 is a diagram illustrating the circuit configuration of a radio-frequency signal transmission/reception device according to a third embodiment.

FIG. 10 is a diagram illustrating the circuit configuration of a radio-frequency signal transmission/reception device according to a third embodiment. A radio-frequency signal transmission/reception device 1b includes modules M1b, M2a, and M2b. That is, the radio-frequency signal transmission/reception device 1b has a configuration in which the module M1b is connected to the multiple modules M2a and M2b. The modules M2a and M2b, which are reception modules, may be reduced in size. Thus, compared with the configuration according to the comparison example (see FIG. 1), the total size of the transmission/reception module and the multiple reception modules may be reduced.

The module M1b is connected to the antenna ANT1 electrically. The module M2a is connected to the antenna ANT2 electrically. The module M2b is connected to an antenna ANT3 electrically. That is, the modules M2a and M2b are electrically connected to the antennas ANT2 and ANT3, respectively.

In normal communication, the radio-frequency signal transmission/reception device 1b supports 1T3R in which radio waves are transmitted from the antenna ANT1, and in which radio waves are received at the antennas ANT1, ANT2, and ANT3. 2T6R may be supported with use of two radio-frequency signal transmission/reception devices 1b.

In SRS communication, the radio-frequency signal transmission/reception device 1b transmits radio waves from the antenna ANT1. In SRS communication, the radio-frequency signal transmission/reception device 1b also transmits radio waves from the antenna ANT2. In SRS communication, the radio-frequency signal transmission/reception device 1b further transmits radio waves from the antenna ANT3.

The module M1b includes the low-pass filter LPF11. The module M1b includes a switch group S2 in addition to the switch group S1.

The switch group S1 includes a switch S1-5 in addition to the switches S1-1 to S1-4. The switch S1-5 is connected, at its first end, to a terminal R13 electrically. The switch S1-5 is connected, at its second end, to a first end of a switch S2-9 electrically. The switches S1-1 to S1-4 are substantially the same as those according to the second embodiment described by referring to FIG. 5, and will not be described. Each switch in the switch group S1 is switched on or off based on the control signal Sig1 received from the control IC 3.

The switch group S2 includes switches S2-6 to S2-9. The switch S2-6 is connected, at its first end, to the second end of the low-pass filter LPF11 electrically. The switch S2-6 is connected, at its second end, to the terminal E11 electrically. The switch group S2 corresponds to a "switch group" provided by the present disclosure.

The switch S2-7 is connected, at its first end, to the second end of the switch S1-4 electrically. The switch S2-7 is connected, at its second end, to the terminal E11 electrically.

The switch S2-8 is connected, at its first end, to the second end of the low-pass filter LPF11 electrically. The switch S2-8 is connected, at its second end, to a terminal E12 electrically.

The switch S2-9 is connected, at its first end, to the second end of the switch S1-5 electrically. The switch S2-9 is connected, at its second end, to the terminal E12 electrically.

Each switch in the switch group S2 is switched on or off based on a control signal Sig2 received from the control IC 3.

The modules M2a and M2b are substantially the same as the configuration of the module M2 according to the second embodiment described by referring to FIG. 5.

The module M2a includes a switch group S3a, which has substantially the same functions as those of the switch group S3 of the module M2 according to the second embodiment, the high-pass filter HPF21, and the low-noise amplifier LNA21. The switch group S3a includes a switch S3a-1, which has substantially the same functions as those of the switch S3-1, a switch S3a-2, which has substantially the same functions as those of the switch S3-2, and a switch S3a-3, which has substantially the same functions as those of the switch S3-3.

The switch S3a-1 is connected, at its first end, to the terminal R21 electrically. The switch S3a-1 is connected, at its second end, to the first end of the high-pass filter HPF21 electrically.

The switch S3a-2 is connected, at its first end, to the terminal R21 electrically. The switch S3a-2 is connected, at its second end, to the output terminal of the low-noise amplifier LNA21 electrically.

The switch S3a-3 is connected, at its first end, to the input terminal of the low-noise amplifier LNA21 electrically. The switch S3a-3 is connected, at its second end, to the first end of the high-pass filter HPF21 electrically. The high-pass filter HPF21 is connected, at its second end, to the terminal A21 electrically.

The switch S3a-1, the switch S3a-2, and the switch S3a-3 may be used so that the low-noise amplifier LNA21 is bypassed in signal transmission using the antenna ANT2.

Each switch in the switch group S3a is switched on or off based on a control signal Sig3a received from a control IC 4a.

The module M2b includes a switch group S3b, which has substantially the same functions as those of the switch group S3 of the module M2 according to the second embodiment, a high-pass filter HPF31, and a low-noise amplifier LNA31. The switch group S3b includes a switch S3b-1, which has substantially the same functions as those of the switch S3-1, a switch S3b-2, which has substantially the same functions as those of the switch S3-2, and a switch S3b-3, which has substantially the same functions as those of the switch S3-3.

The switch S3b-1 is connected, at its first end, to a terminal R31 electrically. The switch S3b-1 is connected, at its second end, to a first end of the high-pass filter HPF31.

The switch S3b-2 is connected, at its first end, to the terminal R31 electrically. The switch S3b-2 is connected, at its second end, to the output terminal of the low-noise amplifier LNA31 electrically.

The switch S3b-3 is connected, at its first end, to the input terminal of the low-noise amplifier LNA31 electrically. The switch S3b-3 is connected, at its second end, to the first end of the high-pass filter HPF31 electrically. The high-pass filter HPF31 is connected, at its second end, to a terminal A31 electrically.

The switch S3b-1, the switch S3b-2, and the switch S3b-3 may be used so that the low-noise amplifier LNA31 is bypassed in signal transmission using the antenna ANT3.

The high-pass filter HPF31 has substantially the same functions as those of the high-pass filter HPF21. The low-noise amplifier LNA31 has substantially the same functions as those of the low-noise amplifier LNA21.

Each switch in the switch group S3b is switched on or off based on a control signal Sig3b received from a control IC 4b.

FIG. 11 is a diagram for describing operations of a radio-frequency signal transmission/reception device according to the third embodiment. Specifically, FIG. 11 is a diagram illustrating a table 30 describing which sites in the modules M1b, M2a, and M2 are passed through by radio-frequency signals in (T) transmission and in (R) reception.

The case of (T) transmission includes (T-1-1) transmission (normal) using the antenna ANT1, (T-1-2) transmission (SRS) using the antenna ANT1, (T-2) transmission (SRS) using the antenna ANT2, and (T-3) transmission (SRS) using the antenna ANT3.

The case of (R) reception includes (R-1) reception (normal) using the antenna ANT1, (R-2) reception (normal) using the antenna ANT2, and (R-3) reception (normal) using the antenna ANT3.

The case of (T-1-1) transmission (normal) using the antenna ANT1 will be described. The second row 32 in the table 30 indicates the sites in the module M1b, through which a radio-frequency transmit signal TX passes in transmission (normal) using the antenna ANT1. The second row 32 in the table 30 is substantially the same as the second row 22 in the table 20 described by referring to FIG. 4, and will not be described.

The case of (T-1-2) transmission (SRS) using the antenna ANT1 is substantially the same as the case of (T-1-1) transmission (normal) using the antenna ANT1, and will not be described. The third row 33 in the table 30 indicates the sites in the module M1b, through which an SRS transmit signal $SRS_T$ passes in SRS transmission using the antenna ANT1.

The case of (T-2) transmission (SRS) using the antenna ANT2 will be described. The fifth row 35 in the table 30 indicates the sites in the modules M1b and M2a, through which an SRS transmit signal $SRS_T$ passes in transmission (SRS) using the antenna ANT2.

In transmission (SRS) using the antenna ANT2, the switches S1-1, S1-2, and S1-4 are switched off based on the control signal Sig1. The switch S1-3 is switched on based on the control signal Sig1. The switch S2-7 is switched off based on the control signal Sig2. The switch S2-6 is switched on based on the control signal Sig2. The switches S3a-2 and S3a-3 are switched off based on the control signal Sig3a. The switch S3a-1 is switched on based on the control signal Sig3a.

An SRS transmit signal $SRS_T$ is received at the terminal T11 which is a left terminal of the module M1b. The power amplifier PA11 amplifies the SRS transmit signal $SRS_T$ to output the amplified signal to the first end of the switch S1-3. The SRS transmit signal $SRS_T$, having passed through the switch S1-3, is received at the first end of the low-pass filter LPF11. The low-pass filter LPF11 low-passes the SRS transmit signal $SRS_T$. That is, frequency components, which are higher than the cutoff frequency of the low-pass filter LPF11, are removed from the SRS transmit signal $SRS_T$. The SRS transmit signal $SRS_T$, having passed through the low-pass filter LPF11, is output to the first end of the switch S2-6. The SRS transmit signal $SRS_T$, having passed through the switch S2-6, is received at the first end of the switch S3a-1 through the terminal E11, which is a right terminal of the module M1b, and the terminal R21, which is the left terminal of the module M2a.

The SRS transmit signal $SRS_T$, having passed through the switch S3a-1, is received at the first end of the high-pass filter HPF21. The high-pass filter HPF21 high-passes the SRS transmit signal $SRS_T$. That is, frequency components, which are lower than the cutoff frequency of the high-pass filter HPF21, are removed from the SRS transmit signal $SRS_T$. The SRS transmit signal $SRS_T$, having passed through the high-pass filter HPF21, is output to the antenna ANT2 through the terminal A21 which is the right terminal of the module M2a.

The case of (T-3) transmission (SRS) using the antenna ANT3 will be described. The seventh row 37 in the table 30 indicates the sites in the modules M1b and M2b, through which an SRS transmit signal $SRS_T$ passes in transmission (SRS) using the antenna ANT3.

In transmission (SRS) using the antenna ANT3, the switches S1-1, S1-2, and S1-5 are switched off based on the control signal Sig1. The switch S1-3 is switched on based on the control signal Sig1. The switch S2-9 is switched off based on the control signal Sig2. The switch S2-8 is switched on based on the control signal Sig2. The switches S3b-2 and S3b-3 are switched off based on the control signal Sig3b. The switch S3b-1 is switched on based on the control signal Sig3b.

An SRS transmit signal $SRS_T$ is received at the terminal T11 which is a left terminal of the module M1b. The power amplifier PA11 amplifies the SRS transmit signal $SRS_T$ to output the amplified signal to the first end of the switch S1-3. The SRS transmit signal $SRS_T$, having passed through the switch S1-3, is received at the first end of the low-pass filter LPF11. The low-pass filter LPF11 low-passes the SRS transmit signal $SRS_T$. That is, frequency components, which are higher than the cutoff frequency of the low-pass filter LPF11, are removed from the SRS transmit signal $SRS_T$. The SRS transmit signal $SRS_T$, having passed through the low-pass filter LPF11, is output to the first end of the switch S2-8. The SRS transmit signal $SRS_T$, having passed through the switch S2-8, is received at the first end of the switch S3b-1 through the terminal E12, which is a right terminal of the module M1b, and the terminal R31, which is the left terminal of the module M2b.

The SRS transmit signal $SRS_T$, having passed through the switch S3b-1, is received at the first end of the high-pass filter HPF31. The high-pass filter HPF31 high-passes the SRS transmit signal $SRS_T$. That is, frequency components, which are lower than the cutoff frequency of the high-pass filter HPF31, are removed from the SRS transmit signal $SRS_T$. The SRS transmit signal $SRS_T$, having passed through the high-pass filter HPF31, is output to the antenna ANT3 through the terminal A31 which is the right terminal of the module M2b.

The case of (R-1) reception (normal) using the antenna ANT1 will be described. The first row 31 in the table 30 indicates the sites in the module M1b, through which a radio-frequency receive signal $RX_1$ passes in reception (normal) using the antenna ANT1. The first row 31 in the table 30 is substantially the same as the first row 21 in the table 20 described by referring FIG. 4, and will not be described.

The case of (R-2) reception (normal) using the antenna ANT2 will be described. The fourth row 34 in the table 30 indicates the sites in the modules M1b and M2a, through which a radio-frequency receive signal $RX_2$ passes in reception (normal) using the antenna ANT2.

In reception (normal) using the antenna ANT2, the switches S1-1, S1-2, and S1-3 are switched off based on the control signal Sig1. The switch S1-4 is switched on based on the control signal Sig1. The switch S2-6 is switched off based on the control signal Sig2. The switch S2-7 is switched on based on the control signal Sig2. The switch S3a-1 is switched off based on the control signal Sig3a. The switches S3a-2 and S3a-3 are switched on based on the control signal Sig3a.

A radio-frequency receive signal $RX_2$ is received at the second end of the high-pass filter HPF21 from the antenna ANT2 through the terminal A21 which is the right terminal of the module M2a. The high-pass filter HPF21 high-passes the radio-frequency receive signal $RX_2$. The radio-frequency receive signal $RX_2$, having passed through the high-pass filter HPF21, is received at the second end of the switch S3a-3. The radio-frequency receive signal $RX_2$, having passed through the switch S3a-3, is received at the input terminal of the low-noise amplifier LNA21. The low-noise amplifier LNA21 amplifies the radio-frequency receive signal $RX_2$ to output the amplified signal to the second end of the switch S3a-2. The radio-frequency receive signal $RX_2$, having passed through the switch S3a-2, is received at the second end of the switch S2-7 through the terminal R21, which is the left terminal of the module M2a, and the terminal E11, which is a right terminal of the module M1b. The radio-frequency receive signal $RX_2$, having passed through the switch S2-7, is received at the second end of the switch S1-4. The radio-frequency receive signal $RX_2$, having passed through the switch S1-4, is output through the terminal R12 which is a left terminal of the module M1b.

The case of (R-3) reception (normal) using the antenna ANT3 will be described. The sixth row 36 in the table 30 indicates the sites in the modules M1b and M2b, through which a radio-frequency receive signal $RX_3$ passes in reception (normal) using the antenna ANT3.

In reception (normal) using the antenna ANT3, the switches S1-1, S1-2, and S1-3 are switched off based on the control signal Sig1. The switch S1-5 is switched on based on the control signal Sig1. The switch S2-8 is switched off based on the control signal Sig2. The switch S2-9 is switched on based on the control signal Sig2. The switch S3b-1 is switched off based on the control signal Sig3b. The switches S3b-2 and S3b-3 are switched on based on the control signal Sig3b.

A radio-frequency receive signal $RX_3$ is received at the second end of the high-pass filter HPF31 from the antenna ANT3 through the terminal A31 which is the right terminal of the module M2b. The high-pass filter HPF31 high-passes the radio-frequency receive signal $RX_3$. The radio-frequency receive signal $RX_3$, having passed through the high-pass filter HPF31, is received at the second end of the switch S3b-3. The radio-frequency receive signal $RX_3$, having passed through the switch S3b-3, is received at the input terminal of the low-noise amplifier LNA31. The low-noise amplifier LNA31 amplifies the radio-frequency receive signal $RX_3$ to output the amplified signal to the second end of the switch S3b-2. The radio-frequency receive signal $RX_2$, having passed through the switch S3b-2, is received at the second end of the switch S2-9 through the terminal R31, which is the left terminal of the module M2b, and the terminal E12, which is a right terminal of the module M1b. The radio-frequency receive signal $RX_3$, having passed through the switch S2-9, is received at the second end of the switch S1-5. The radio-frequency receive signal $RX_3$, having passed through the switch S1-5, is output through the terminal R13 which is a left terminal of the module M1b.

According to the third embodiment described above, a transmission/reception module (the module M1*b*) may be connected to multiple reception modules (the modules M2*a* and M2*b*). Thus, in reception of signals, receive paths with multiple antennas (the antenna ANT2 and ANT3) may be implemented. Therefore, the receiver sensitivity may be further improved. In addition, both the high-pass filters HPF21 and HPF31 in the reception modules (the module M2*a* and M2*b*) do not have an optional function for transmission, for example, a function of removing harmonic waves. Therefore, the filters may be reduced in size, and the second modules (the modules M2*a* and M2*b*) may be reduced in size. This configuration has a greater merit of a reduction in size, in a configuration in which multiple pairs of reception modules are provided for a single transmission/reception module, such as 1T4R which more strongly requires a reduction of the module size.

The Frequency Band Provided by the Filter Function

FIG. 12 is a diagram illustrating an exemplary frequency band provided by the filter function used in the present disclosure. The left side of FIG. 12 represents relatively-low frequency, and the right side represents relatively-high frequency. As illustrated in FIG. 12, the pass band, which is provided by the filter function and which matches the frequency band of a transmit/receive signal SS, enables signals in given frequency bands to be removed. Specifically, signals in frequency bands lower than that of the transmit/receive signal SS and signals in higher frequency bands may be removed. That is, noise N1 and noise SN1 having frequency lower than the frequency band of the transmit/receive signal SS, and noise N2 and noise SN2 in frequency bands higher than that of the transmit/receive signal SS may be removed.

The noise N1 and the noise N2 are generated by a device, such as a different device, other than a radio-frequency signal transmission/reception device provided by the present disclosure. The noise SN1 and the noise SN2 are generated by the radio-frequency signal transmission/reception device itself, which is provided by the present disclosure. All the noise N1, the noise N2, the noise SN1, and the noise SN2 are to be removed by the radio-frequency signal transmission/reception device in reception. The pass band, which is provided by the filter function and which matches the frequency band of the transmit/receive signal SS, causes the noise N1 and the noise N2 to be removed in reception.

The pass band, which is provided by the filter function and which matches the frequency band of the transmit/receive signal SS, causes the noise SN1 and the noise SN2 to be removed in transmission. The noise SN1, which is removed in transmission, is, for example, a spurious component generated by a power amplifier. In transmission, the noise SN2 is removed, and n-th harmonic waves SP1 are removed. An n-th harmonic wave SP1 is a signal of n times the frequency of a transmit signal (n is a natural number). The frequency band of the n-th harmonic waves SP1 overlaps the frequency band of the noise N2 partially. That is, the pass band, which is provided by the filter function and which matches the frequency band of the transmit/receive signal SS, enables removal, in transmission, of the noise SN1 such as a spurious component generated by a power amplifier, the noise SN2 such as a spurious component generated by a power amplifier, and the n-th harmonic waves SP1.

To remove noise, which exerts influence in reception, a filter function, which enables noise in the frequency bands corresponding to the noise N1 and the noise N2 to be decreased, for example, by 20 dB to 40 dB, is used. To remove the noise and the n-th harmonic waves, which exert influence in transmission, a filter function, which enables noise in the frequency bands of the noise SN1, the noise SN2, and the n-th harmonic waves SP1 to be decreased by 40 dB or more, is used.

What is claimed is:

1. A radio-frequency signal transmission/reception circuit comprising:
    first, second, third, fourth, and fifth terminals;
    a low-noise amplifier having an output terminal that is connected to the first terminal electrically;
    a first switch having a first end that is connected to an input terminal of the low-noise amplifier electrically;
    a band-pass filter having a first end that is connected to a second end of the first switch electrically, and having a second end that is connected to a first antenna through the fourth terminal electrically;
    a power amplifier having an input terminal that is connected to the second terminal electrically;
    a second switch having a first end that is connected to an output terminal of the power amplifier electrically, and having a second end that is connected to the first end of the band-pass filter electrically;
    a low-pass filter having a first end that is connected to the fifth terminal electrically;
    a third switch having a first end that is connected to the output terminal of the power amplifier electrically, and having a second end that is connected to a second end of the low-pass filter electrically; and
    a fourth switch having a first end that is connected to the third terminal electrically, and having a second end that is connected to the low-pass filter electrically.

2. The radio-frequency signal transmission/reception circuit according to claim 1,
    wherein the fourth switch is connected to the second end of the low-pass filter electrically,
    wherein the third switch is in an OFF state during signal reception, and is in an ON state during signal transmission, and
    wherein the fourth switch is in an OFF state during signal transmission, and is in an ON state during signal reception.

3. The radio-frequency signal transmission/reception circuit according to claim 1,
    wherein the fourth switch is connected to the first end of the low-pass filter electrically,
    wherein the third switch is in an OFF state during signal reception, and is in an ON state during signal transmission, and
    wherein the fourth switch is in an OFF state during signal transmission, and is in an ON state during signal reception.

4. The radio-frequency signal transmission/reception circuit according to claim 3, comprising:
    a plurality of the third terminals;
    a plurality of the fourth switches that are associated with the plurality of third terminals in a one-to-one relationship; and
    a plurality of the fifth terminals,
    wherein the plurality of third terminals are associated with the plurality of fifth terminals in a one-to-one relationship, and
    wherein the radio-frequency signal transmission/reception circuit further comprises a switch group, the switch group being configured to set electrical connection states between the plurality of third terminals and the plurality of fifth terminals associated with the plurality of third terminals, and to set electrical connection states between the plurality of fifth terminals and the first end of the low-pass filter.

5. The radio-frequency signal transmission/reception circuit according to claim 1, wherein during transmission with the first antenna:
the second switch is in an ON state, and the first, third, and fourth switches are in OFF states,
the power amplifier is configured to amplify a radio-frequency transmit signal received at the second terminal, and to output an amplified radio-frequency transmit signal to the band-pass filter through the second switch, and
the band-pass filter is configured to pass the amplified radio-frequency transmit signal, and to output a band-passed signal to the first antenna through the fourth terminal.

6. The radio-frequency signal transmission/reception circuit according to claim 1, wherein during reception with the first antenna:
the first switch is in an ON state, and the second, third, and fourth switches are in OFF states,
the band-pass filter is configured to pass a radio-frequency receive signal received from the first antenna through the fourth terminal, and to output a band-passed radio-frequency receive signal to the low-noise amplifier through the first switch, and
the low-noise amplifier is configured to amplify the band-passed radio-frequency receive signal, and to output an amplified signal from the first terminal.

7. The radio-frequency signal transmission/reception circuit according to claim 1, wherein during transmission with a second antenna different from the first antenna:
the third switch is in an ON state, and the first, second, and fourth switches are in OFF states, and
the power amplifier is configured to amplify a radio-frequency transmit signal received at the second terminal, and to output an amplified signal from the fifth terminal through the third switch and the low-pass filter.

8. The radio-frequency signal transmission/reception circuit according to claim 1, wherein during reception with a second antenna different from the first antenna:
the fourth switch is in an ON state, and the first, second, and third switches are in OFF states, and
a radio-frequency receive signal received at the fifth terminal is output from the third terminal through the low-pass filter and the fourth switch.

9. The radio-frequency signal transmission/reception circuit according to claim 1, wherein during reception with a second antenna different from the first antenna,
the fourth switch is in an ON state, and the first, second, and third switches are in OFF states, and
a radio-frequency receive signal received at the fifth terminal is output from the third terminal through the fourth switch.

10. The radio-frequency signal transmission/reception circuit according to claim 1, wherein the radio-frequency signal transmission/reception circuit is configured to receive or transmit signals in an ultra high frequency band.

11. A radio-frequency signal transmission/reception device comprising:
the radio-frequency signal transmission/reception circuit according to claim 1; and
a different radio-frequency signal transmission/reception circuit,
wherein the different radio-frequency signal transmission/reception circuit comprises:
a sixth terminal and a seventh terminal,
a fifth switch having a first end that is connected to the sixth terminal electrically,
a sixth switch having a first end that is connected to the sixth terminal electrically,
a high-pass filter having a first end that is connected to a second end of the fifth switch electrically, and having a second end that is connected to a second antenna through the seventh terminal electrically,
a low-noise amplifier having an output terminal that is connected to a second end of the sixth switch electrically, and
a seventh switch having a first end that is connected to an input terminal of the low-noise amplifier electrically, and having a second end that is connected to the first end of the high-pass filter electrically,
wherein the fifth terminal is connected to the sixth terminal electrically, and
wherein the high-pass filter is configured to remove a signal in a given frequency band.

12. The radio-frequency signal transmission/reception device according to claim 11, wherein during transmission with the second antenna:
the fifth switch is in an ON state,
the sixth and seventh switches are in OFF states,
the high-pass filter is configured to remove a signal in the given frequency band, and
an output from the high-pass filter is output to the second antenna through the seventh terminal.

13. The radio-frequency signal transmission/reception device according to claim 11, wherein during reception with the second antenna,
the fifth switch is in an OFF state,
the sixth and seventh switches are in ON states, and
the low-noise amplifier is configured to amplify a signal from which a signal in a low frequency band has been removed by the high-pass filter, the low frequency band being lower than a frequency band of a signal that is transmitted, and to input an amplified signal to the fifth terminal through the sixth terminal.

* * * * *